United States Patent
Yoshida et al.

(10) Patent No.: US 8,150,319 B2
(45) Date of Patent: Apr. 3, 2012

(54) COMMUNICATION APPARATUS

(75) Inventors: Yuko Yoshida, Tokyo (JP); Yoshihito Ishibashi, Tokyo (JP); Fumio Kubono, Tokyo (JP); Shoji Nagai, Tokyo (JP); Naoki Ide, Tokyo (JP)

(73) Assignee: Sony Corporation, Tokyo (JP)

( * ) Notice: Subject to any disclaimer, the term of this patent is extended or adjusted under 35 U.S.C. 154(b) by 784 days.

(21) Appl. No.: 12/211,697

(22) Filed: Sep. 16, 2008

(65) Prior Publication Data

US 2009/0088114 A1     Apr. 2, 2009

(30) Foreign Application Priority Data

Sep. 27, 2007   (JP) ................ P2007-250728

(51) Int. Cl.
 *H04B 7/00*   (2006.01)

(52) U.S. Cl. ........ 455/41.2; 455/41.1; 455/82; 343/718; 343/866

(58) Field of Classification Search ................ 455/41.1, 455/41.2, 41.3, 82, 83, 269, 562.1; 343/718, 343/866
See application file for complete search history.

(56) References Cited

U.S. PATENT DOCUMENTS

| | | | | |
|---|---|---|---|---|
| 5,532,705 | A * | 7/1996 | Hama | 343/718 |
| 6,275,045 | B1 * | 8/2001 | Eloy | 324/639 |
| 6,597,320 | B2 * | 7/2003 | Maeda et al. | 343/718 |
| 2007/0139285 | A1 * | 6/2007 | Maruyama et al. | 343/741 |

FOREIGN PATENT DOCUMENTS

| | | |
|---|---|---|
| JP | 11-120312 | 4/1999 |
| JP | 11-188013 | 7/1999 |
| JP | 2000-132655 | 5/2000 |
| JP | 2002-158519 | 5/2002 |
| JP | 2004-328120 | 11/2004 |
| JP | 2006-352318 | 12/2006 |

OTHER PUBLICATIONS

Japanese Office Action in correspoding Japanese Patent Application 2007-250728 dated Aug. 25, 2009 (4 pages).

* cited by examiner

*Primary Examiner* — Tuan H Nguyen

(74) *Attorney, Agent, or Firm* — Finnegan, Henderson, Farabow, Garrett & Dunner, L.L.P.

(57) ABSTRACT

A communication apparatus includes an antenna configured to generate a magnetic field corresponding to a signal of a first communication method; and a communication unit configured to perform communication via a communication medium by transmitting/receiving a signal of a second communication method by using a potential difference between the communication unit and a predetermined reference point, the communication unit including a transparent conductive film. The antenna and the communication unit are integrated with each other.

16 Claims, 10 Drawing Sheets

COMMUNICATION APPARATUS

CROSS REFERENCES TO RELATED APPLICATIONS

The present invention contains subject matter related to Japanese Patent Application JP 2007-250728 filed in the Japanese Patent Office on Sep. 27, 2007, the entire contents of which are incorporated herein by reference.

BACKGROUND OF THE INVENTION

1. Field of the Invention

The present invention relates to a communication apparatus. More specifically, the present invention relates to a miniaturized communication apparatus capable of performing communication more reliably.

2. Description of the Related Art

In a noncontact IC (integrated circuit) card system according to a related art, when a user puts a noncontact IC card over a reader/writer, the noncontact IC card receives a magnetic field emitted from the reader/writer and an electromotive force is generated, so that data communication is performed between the noncontact IC card and the reader/writer.

Also, the following communication method has been under consideration (e.g., see Patent Document 1: Japanese Unexamined Patent Application Publication No. 2006-352318). In this method, a human-body communication technique of using a human body as a communication medium is used in the above-described noncontact IC card system, and a reader/writer and a noncontact IC card perform data communication with each other without user's putting of the noncontact IC card over the reader/writer.

A communication terminal apparatus to perform communication in such a communication method is provided with a loop antenna and a noncontact IC communication circuit for noncontact IC card communication; and a human-body communication circuit and a communication electrode for human-body communication. The communication terminal apparatus transmits/receives data to/from a reader/writer via an apparatus performing human-body communication.

At data transmission, the noncontact IC communication circuit receives a signal transmitted from the reader/writer via the loop antenna, and the human-body communication circuit converts the received signal to a signal for human-body communication and transmits the signal obtained through the conversion from the communication electrode. The signal transmitted from the communication electrode is received by an apparatus on the other end of communication via a human body as a communication medium.

On the other hand, at data reception, the communication electrode of the communication terminal apparatus receives a signal for human-body communication transmitted from an apparatus on the other end of communication via a human body, and the human-body communication circuit converts the received signal to a signal for noncontact IC card communication. The signal obtained through the conversion is transmitted via the noncontact IC communication circuit from the loop antenna. Then, the noncontact IC communication circuit receives a response signal from a noncontact IC card via the loop antenna and performs a process in response to the received signal.

SUMMARY OF THE INVENTION

In the above-described communication terminal apparatus, however, the communication electrode for human-body communication is composed of a dielectric material. For this reason, when the communication electrode is placed near the loop antenna for noncontact IC card communication, an effect of a magnetic field generated from the loop antenna causes generation of an eddy current on the communication electrode. Then, a magnetic field generated due to the eddy current and the magnetic field emitted from the loop antenna cancel each other out, so that efficient power supply and data communication may become impossible.

In an existing communication terminal apparatus for noncontact IC card communication, an area for mounting a noncontact IC communication circuit and a loop antenna is provided. However, it is undesirable to newly provide an area for mounting a communication electrode and a human-body communication circuit for human-body communication in the communication terminal apparatus that has been becoming smaller year after year.

As described above, in the communication terminal apparatus provided with the noncontact IC communication circuit for noncontact IC card communication and the human-body communication circuit for human-body communication, it has been difficult to realize both reliable communication and miniaturization of the communication terminal apparatus.

The present invention has been made in view of these circumstances and is directed to realizing more reliable communication and miniaturization of a communication terminal apparatus.

A communication apparatus according to a first embodiment of the present invention includes an antenna configured to generate a magnetic field corresponding to a signal of a first communication method; and a communication unit configured to perform communication via a communication medium by transmitting/receiving a signal of a second communication method by using a potential difference between the communication unit and a predetermined reference point, the communication unit including a transparent conductive film. The antenna and the communication unit are integrated with each other.

The antenna is wound on a side surface of the communication unit, whereby the antenna can be integrated with the communication unit.

A material of the antenna is applied on a surface of the communication unit, whereby the antenna can be provided on the surface of the communication unit.

A substrate provided with the antenna is laminated on the communication unit, whereby the antenna and the communication unit can be integrated with each other.

In the first embodiment of the present invention, the antenna configured to generate a magnetic field corresponding to a signal of a first communication method is integrated with the communication unit configured to perform communication via a communication medium by transmitting/receiving a signal of a second communication method by using a potential difference between the communication unit and a predetermined reference point, the communication unit including a transparent conductive film.

A communication apparatus according to a second embodiment of the present invention includes an antenna configured to generate a magnetic field corresponding to a first signal of a first communication method; first communication control means for obtaining the first signal received by the antenna or allowing the antenna to generate a magnetic field and to transmit the first signal; and second communication control means for transmitting a second signal of a second communication method by causing a potential difference between a predetermined reference point and the antenna or receiving the second signal by detecting a potential difference occurred between the reference point and the antenna, wherein the second communication control means connects to the antenna.

The second communication control means can convert the first signal obtained by the first communication control means to the second signal and transmit the second signal, or can convert the received second signal to the first signal and supply the first signal to the first communication control means.

In the second embodiment of the present invention, the first signal received by the antenna generating a magnetic field corresponding to the first signal of the first communication method is obtained, or a magnetic field is generated by the antenna and the first signal is transmitted. Also, the second signal of the second communication method is transmitted by causing a potential difference between the predetermined reference point and the antenna, or the second signal is received by detecting a potential difference occurred between the reference point and the antenna.

A communication apparatus according to a third embodiment of the present invention includes an antenna configured to generate a magnetic field corresponding to a first signal of a first communication method; first communication control means for obtaining the first signal received by the antenna or allowing the antenna to generate a magnetic field and to transmit the first signal; a communication unit configured to transmit or receive a second signal of a second communication method via a communication medium; and second communication control means for transmitting the second signal by causing a potential difference between the antenna and the communication unit or receiving the second signal by detecting a potential difference occurred between the antenna and the communication unit, wherein the second communication control means connects to the antenna and the communication unit.

The second communication control means can convert the first signal obtained by the first communication control means to the second signal and transmit the second signal, or can convert the received second signal to the first signal and supply the first signal to the first communication control means.

The communication unit can include a transparent conductive film and can be provided in an opening portion of the antenna.

In the third embodiment of the present invention, the first signal received by the antenna generating a magnetic field corresponding to the first signal of the first communication method is obtained, or a magnetic field is generated by the antenna and the first signal is transmitted. Also, the second signal is transmitted by causing a potential difference between the communication unit to transmit or receive the second signal of the second communication method via the communication medium and the antenna, or the second signal is received by detecting a potential difference occurred between the antenna and the communication unit.

According to the first embodiment of the present invention, communication with an apparatus can be performed. Particularly, according to the first embodiment of the present invention, communication can be performed more reliably and miniaturization can be realized.

According to the second embodiment of the present invention, communication with an apparatus can be performed. Particularly, according to the second embodiment of the present invention, communication can be performed more reliably and miniaturization can be realized.

According to the third embodiment of the present invention, communication with an apparatus can be performed. Particularly, according to the third embodiment of the present invention, communication can be performed more reliably and miniaturization can be realized.

DESCRIPTION OF THE PREFERRED EMBODIMENTS

Before describing embodiments of the present invention, the correspondence between the features of the claims and the specific elements in the embodiments of the present invention described in the specification or drawings is discussed below. This description is intended to assure that the embodiments supporting the claimed invention are described in the specification or drawings. Thus, even if an element in the following embodiments described in the specification or drawings is not described as relating to a certain feature of the present invention, that does not necessarily mean that the element does not relate to that feature of the claims. Conversely, even if an element is described herein as relating to a certain feature of the claims, that does not necessarily mean that the element does not relate to other features of the claims.

A communication apparatus according to the first embodiment of the present invention (e.g., the communication terminal apparatus 12 in FIG. 1) includes an antenna (e.g., the loop antenna 22 in FIG. 1) configured to generate a magnetic field corresponding to a signal of a first communication method; and a communication unit (e.g., the communication electrode 25 in FIG. 1) configured to perform communication via a communication medium by transmitting/receiving a signal of a second communication method by using a potential difference between the communication unit and a predetermined reference point, the communication unit including a transparent conductive film. The antenna and the communication unit are integrated with each other.

Figure 5:
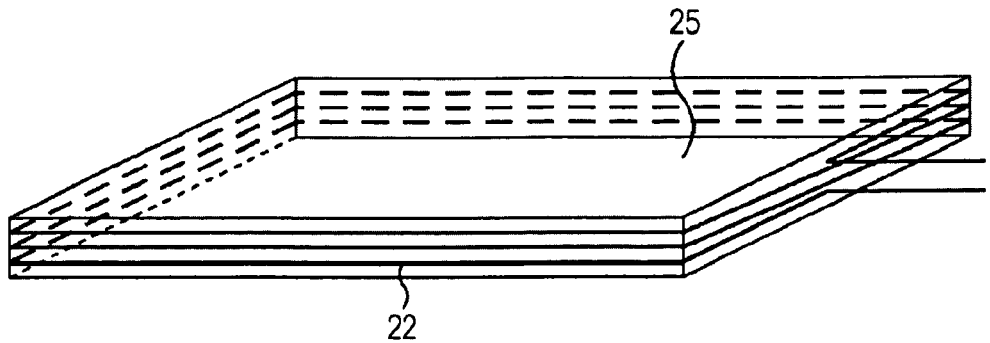
FIG. 5 is a diagram illustrating a more specific example of the configuration of the loop antenna and the communication electrode.

In the communication apparatus, the antenna is wound on a side surface of the communication unit, whereby the antenna can be integrated with the communication unit (e.g., the configuration illustrated in FIG. 5).

Figure 6:
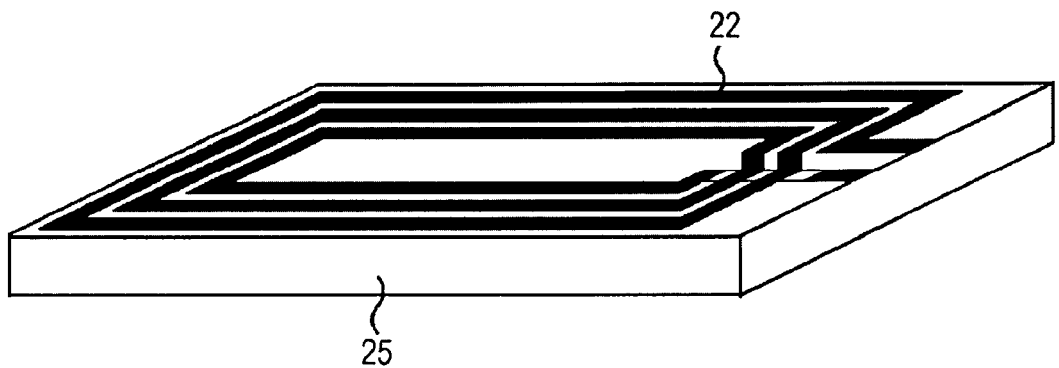
FIG. 6 is a diagram illustrating another example of the configuration of the loop antenna and the communication electrode.

In the communication apparatus, a material of the antenna is applied on a surface of the communication unit, whereby the antenna can be provided on the surface of the communication unit (e.g., the configuration illustrated in FIG. 6).

Figure 7:
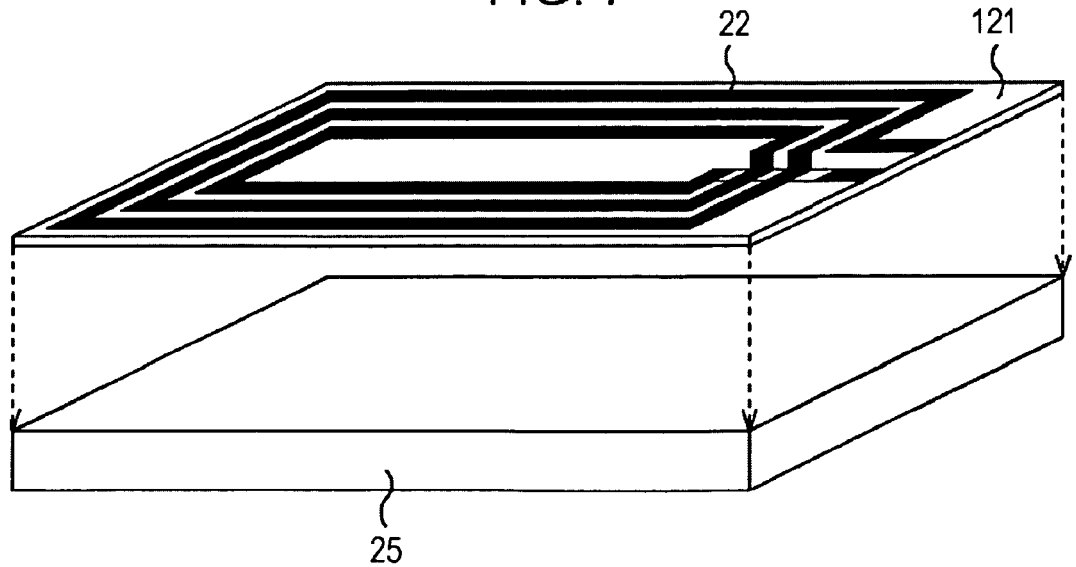
FIG. 7 is a diagram illustrating another example of the configuration of the loop antenna and the communication electrode.

In the communication apparatus, a substrate provided with the antenna is laminated on the communication unit, whereby the antenna and the communication unit can be integrated with each other (e.g., the configuration illustrated in FIG. 7).

Figure 9:
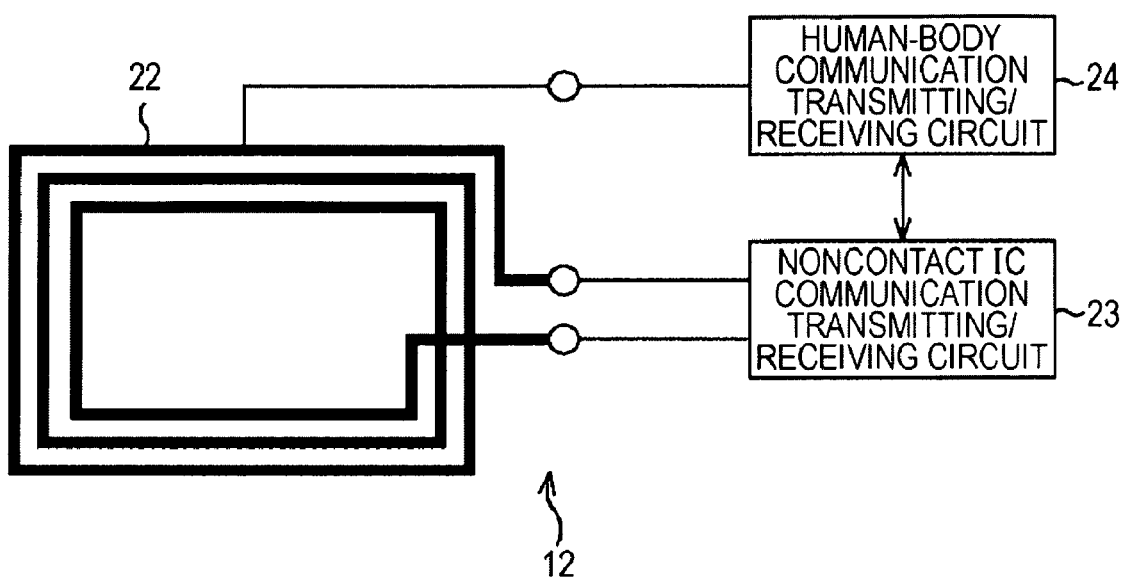
FIG. 9 is a diagram illustrating another example of the configuration of a communication terminal apparatus.

A communication apparatus according to the second embodiment of the present invention (e.g., the communication terminal apparatus 12 in FIG. 9) includes an antenna (e.g., the loop antenna 22 in FIG. 9) configured to generate a magnetic field corresponding to a first signal of a first communication method; first communication control means (e.g., the noncontact IC communication transmitting/receiving circuit 23 in FIG. 9) for obtaining the first signal received by the antenna or allowing the antenna to generate a magnetic field and to transmit the first signal; and second communication control means (e.g., the human-body communication transmitting/receiving circuit 24 in FIG. 9) for transmitting a second signal of a second communication method by causing a potential difference between a predetermined reference point and the antenna or receiving the second signal by detecting a potential difference occurred between the reference point and the antenna, wherein the second communication control means connects to the antenna.

Figure 14:
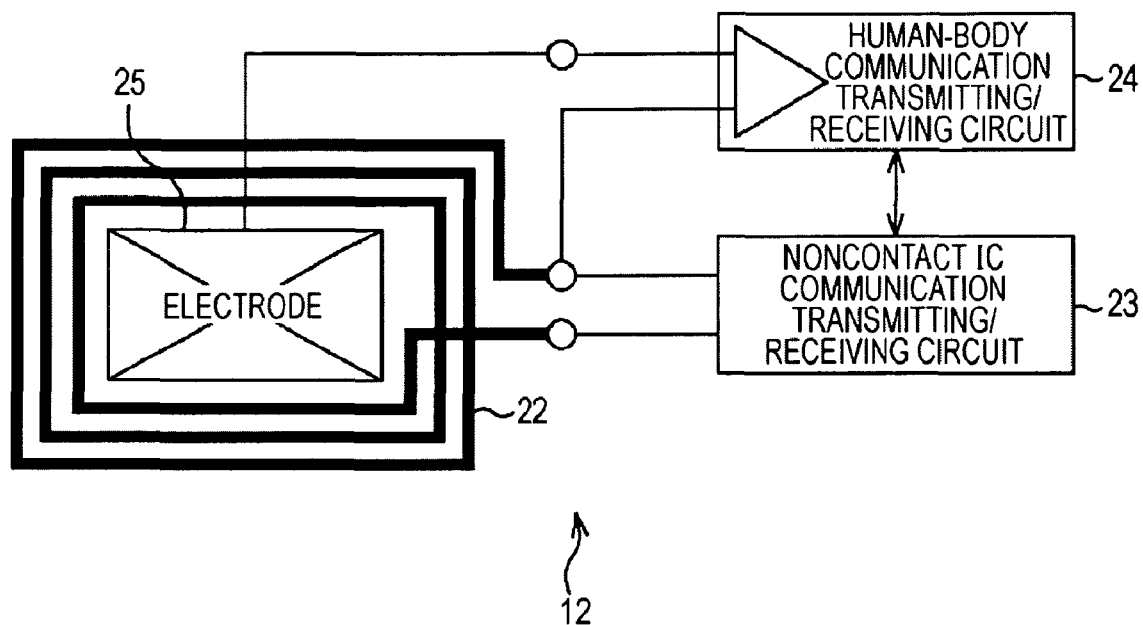
FIG. 14 is a diagram illustrating another example of the configuration of the communication terminal apparatus.

A communication apparatus according to the third embodiment of the present invention (e.g., the communication terminal apparatus 12 in FIG. 14) includes an antenna (e.g., the loop antenna 22 in FIG. 14) configured to generate a magnetic field corresponding to a first signal of a first communication method; first communication control means (e.g., the noncontact IC communication transmitting/receiving circuit 23 in FIG. 14) for obtaining the first signal received by the antenna or allowing the antenna to generate a magnetic field and to transmit the first signal; a communication unit (e.g., the communication electrode 25 in FIG. 14) configured to transmit or receive a second signal of a second communication method via a communication medium; and second communication control means (e.g., the human-body communication transmitting/receiving circuit 24 in FIG. 14) for transmitting the second signal by causing a potential difference between the antenna and the communication unit or receiving the second signal by detecting a potential difference occurred between the antenna and the communication unit, wherein the second communication control means connects to the antenna and the communication unit.

Hereinafter, embodiments of the present invention are described with reference to the drawings.

Figure 1:
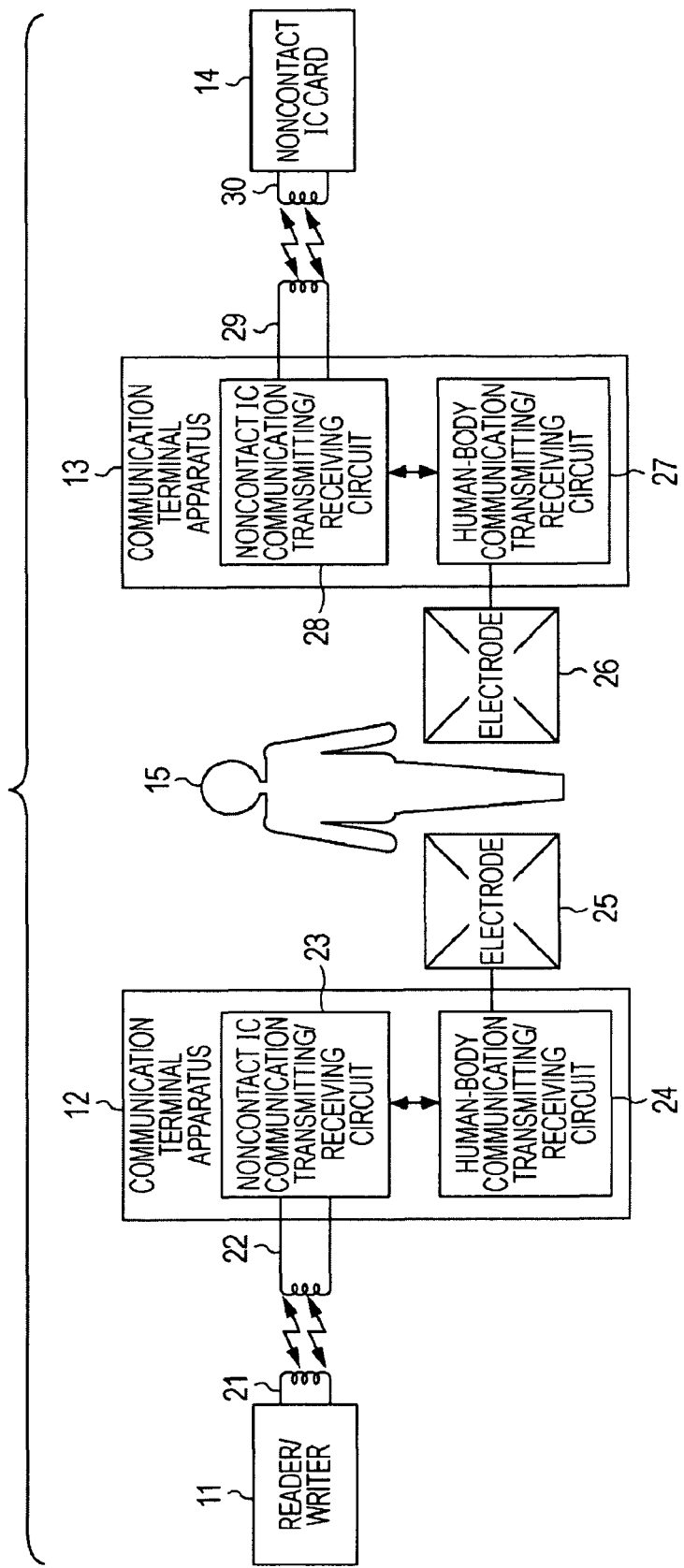
FIG. 1 is a diagram illustrating an example of a configuration of a communication system according to an embodiment of the present invention.

FIG. 1 is a diagram illustrating an example of a configuration of a communication system according to an embodiment of the present invention. This communication system includes a reader/writer 11 for noncontact IC card communication, a communication terminal apparatus 12, a communication terminal apparatus 13, a noncontact IC card 14, and a human body 15 as a user.

For example, in the communication system, the reader/writer 11 and the communication terminal apparatus 12 are placed in a predetermined position while being fixed, whereas the communication terminal apparatus 13 and the noncontact IC card 14 are carried by the human body 15 as a user. Specifically, the user carries the communication terminal apparatus 13 and the noncontact IC card 14 by holding them in his/her hand or in a pocket. The communication terminal apparatus 13 and the noncontact IC card 14 may be constituted as a single apparatus or separate apparatuses.

Such a communication system is used as, for example, an automatic ticket gate control system in which the user adjusts the fare at the ticket gate in a train station. In such a case, the reader/writer 11 and the communication terminal apparatus 12 are placed at the ticket gate, and the user (human body 15) adjusts the fare at the ticket gate by using the communication terminal apparatus 13 and the noncontact IC card 14 carried thereby.

The reader/writer 11 is provided with a loop antenna 21 for noncontact radio communication. The reader/writer 11 supplies a current to the loop antenna 21 so as to generate a magnetic field and transmits/receives a signal for noncontact IC card communication to/from the communication terminal apparatus 12.

The communication terminal apparatus 12 performs noncontact IC card communication with the reader/writer 11 and also performs human-body communication with the communication terminal apparatus 13 by using the human body 15 as a communication medium. The communication terminal apparatus 12 is provided with a loop antenna 22 for radio communication, a noncontact IC communication transmitting/receiving circuit 23, a human-body communication transmitting/receiving circuit 24, and a communication electrode 25.

The loop antenna 22 receives a magnetic field generated from the loop antenna 21, thereby receiving a signal transmitted from the reader/writer 11. Also, the loop antenna 22 transmits a signal for noncontact IC card communication to the reader/writer 11.

The noncontact IC communication transmitting/receiving circuit 23 obtains the signal received by the loop antenna 22 and supplies the signal to the human-body communication transmitting/receiving circuit 24. Also, when being supplied with a signal from the human-body communication transmitting/receiving circuit 24, the noncontact IC communication transmitting/receiving circuit 23 allows the loop antenna 22 to transmit the signal. Specifically, the noncontact IC communication transmitting/receiving circuit 23 changes a load on the loop antenna 22 in accordance with the data to be transmitted, thereby allowing the loop antenna 22 to transmit the signal.

The human-body communication transmitting/receiving circuit 24 converts the signal for noncontact IC card communication supplied from the noncontact IC communication transmitting/receiving circuit 23 to a signal for human-body communication, and then transmits the signal obtained through the conversion to the communication terminal apparatus 13 via the communication electrode 25. Specifically, the human-body communication transmitting/receiving circuit 24 causes a potential difference between a ground (not illustrated) provided in the human-body communication transmitting/receiving circuit 24 and the communication electrode 25 in accordance with the signal (data) to be transmitted, thereby transmitting the signal for human-body communication to the communication terminal apparatus 13 via the human body 15 as a communication medium.

Also, the human-body communication transmitting/receiving circuit 24 detects a potential difference occurred between the ground and the communication electrode 25, thereby receiving a signal for human-body communication transmitted from the communication terminal apparatus 13 via the human body 15, converts the received signal to a signal for noncontact IC card communication, and then supplies the signal to the noncontact IC communication transmitting/receiving circuit 23.

The communication electrode 25 includes a transparent conductive film of ITO (Indium Tin Oxide), zinc oxide, tin oxide, or the like, and capacitively couples with the human body 15. Also, the communication electrode 25 transmits/receives a signal for human-body communication by using a potential difference between the communication electrode 25 and a reference point, which is the ground. Specifically, the communication electrode 25 transmits a signal supplied from the human-body communication transmitting/receiving circuit 24 to the communication terminal apparatus 13 via the human body 15, and receives a signal transmitted from the communication terminal apparatus 13 via the human body 15 and supplies the signal to the human-body communication transmitting/receiving circuit 24.

The communication terminal apparatus 13 performs human-body communication with the communication terminal apparatus 12 by using the human body 15 as a communication medium and also performs noncontact radio communication, that is, noncontact IC card communication, with the noncontact IC card 14. The communication terminal apparatus 13 is provided with a communication electrode 26, a human-body communication transmitting/receiving circuit 27, a noncontact IC communication transmitting/receiving circuit 28, and a loop antenna 29.

The communication electrode 26 includes a transparent conductive film of ITO, zinc oxide, tin oxide, or the like, and capacitively couples with the human body 15. Also, the communication electrode 26 transmits/receives a signal for human-body communication by using a potential difference between the communication electrode 26 and a reference point, which is a ground (not illustrated) provided in the human-body communication transmitting/receiving circuit 27. Specifically, the communication electrode 26 receives a signal transmitted from the communication terminal apparatus 12 via the human body 15 and supplies the signal to the human-body communication transmitting/receiving circuit 27, and also transmits a signal supplied from the human-body communication transmitting/receiving circuit 27 to the communication terminal apparatus 12 via the human body 15.

The human-body communication transmitting/receiving circuit 27 converts the signal for human-body communication received by the communication electrode 26 to a signal for noncontact IC card communication and supplies the signal to the noncontact IC communication transmitting/receiving circuit 28. Also, the human-body communication transmitting/receiving circuit 27 converts a signal for noncontact IC card communication supplied from the noncontact IC communication transmitting/receiving circuit 28 to a signal for human-body communication and transmits the signal obtained through the conversion to the communication terminal apparatus 12 via the communication electrode 26.

Specifically, the human-body communication transmitting/receiving circuit 27 detects a potential difference between the ground provided in the human-body communication transmitting/receiving circuit 27 and the communication electrode 26, thereby receiving a signal transmitted from the communication terminal apparatus 12. Also, the human-body communication transmitting/receiving circuit 27 causes a potential difference between the ground and the communication electrode 26 in accordance with the signal (data) for human-body communication to be transmitted, thereby transmitting a signal to the communication terminal apparatus 12 via the human body 15.

The noncontact IC communication transmitting/receiving circuit 28 supplies a current to the loop antenna 29 in accordance with the signal supplied from the human-body communication transmitting/receiving circuit 27 so as to generate a magnetic field, thereby transmitting a signal to the noncontact IC card 14. Also, the noncontact IC communication transmitting/receiving circuit 28 obtains a signal from the noncontact IC card 14 received by the loop antenna 29 and supplies the signal to the human-body communication transmitting/receiving circuit 27.

The loop antenna 29 generates a magnetic field in accordance with control by the noncontact IC communication transmitting/receiving circuit 28, thereby transmitting a signal for noncontact IC card communication to the noncontact IC card 14, and receives a change in load of the noncontact IC card 14, thereby receiving a signal transmitted from the noncontact IC card 14.

The noncontact IC card 14 is provided with a loop antenna 30 for noncontact radio communication and performs noncontact IC card communication with the communication terminal apparatus 13 by changing a load of the loop antenna 30 or receiving a magnetic field in the loop antenna 30. Specifically, the noncontact IC card 14 receives a magnetic field generated from the loop antenna 29 by the loop antenna 30, thereby obtaining power to drive the noncontact IC card 14 and receiving a signal transmitted from the communication terminal apparatus 13.

Also, the noncontact IC card 14 changes a load on the loop antenna 30 in accordance with the data to be transmitted and allows the loop antenna 30 to generate a magnetic field corresponding to the data, thereby allowing the loop antenna 30 to transmit a signal for noncontact IC card communication.

Next, operations of the respective apparatuses in the communication system illustrated in FIG. 1 are described. In the case where the reader/writer 11 communicates with the noncontact IC card 14 via the human body 15, the reader/writer 11 allows the loop antenna 21 to generate a magnetic field corresponding to the data to be transmitted from the loop antenna 21 and to transmit a signal for transmitting the data. Then, the loop antenna 22 receives the signal transmitted from the loop antenna 21 and supplies the received signal to the human-body communication transmitting/receiving circuit 24 via the noncontact IC communication transmitting/receiving circuit 23.

The human-body communication transmitting/receiving circuit 24 converts the signal for noncontact IC card communication supplied from the noncontact IC communication transmitting/receiving circuit 23 to a signal for human-body communication, and transmits the signal obtained through the conversion to the communication terminal apparatus 13 via the communication electrode 25 by using a potential difference.

Then, the communication electrode 26 receives the signal transmitted from the communication terminal apparatus 12 via the human body 15. The human-body communication transmitting/receiving circuit 27 converts the signal for human-body communication received by the communication electrode 26 to a signal for noncontact IC card-communication and supplies the signal to the noncontact IC communication transmitting/receiving circuit 28. The noncontact IC communication transmitting/receiving circuit 28 allows the loop antenna 29 to transmit the signal supplied from the human-body communication transmitting/receiving circuit 27. The noncontact IC card 14 receives the signal transmitted from the loop antenna 29 by the loop antenna 30.

Then, the noncontact IC card 14 performs a process in response to the received signal. For example, the noncontact IC card 14 transmits data requested by the reader/writer 11 to the reader/writer 11 in response to the received signal. Specifically, the noncontact IC card 14 transmits a signal for transmitting the data from the loop antenna 30 by using a change in load in accordance with the data to be transmitted.

The loop antenna 29 receives the signal transmitted from the noncontact IC card 14 and supplies the received signal to the human-body communication transmitting/receiving circuit 27 via the noncontact IC communication transmitting/receiving circuit 28. The human-body communication transmitting/receiving circuit 27 converts the signal for noncontact IC card communication supplied from the noncontact IC communication transmitting/receiving circuit 28 to a signal for human-body communication and transmits the signal obtained through the conversion to the communication terminal apparatus 12 via the communication electrode 26 by using a potential difference.

The communication electrode 25 receives the signal transmitted from the communication terminal apparatus 13 via the human body 15. The human-body communication transmitting/receiving circuit 24 converts the signal for human-body communication received by the communication electrode 25 to a signal for noncontact IC card communication and supplies the signal to the noncontact IC communication transmitting/receiving circuit 23. The noncontact IC communication transmitting/receiving circuit 23 allows the loop antenna 22 to transmit the signal supplied from the human-body communication transmitting/receiving circuit 24. The reader/writer 11 receives the signal transmitted from the loop antenna 22 by the loop antenna 21 and performs a process in response to the received signal.

In the communication system illustrated in FIG. 1, communication between the noncontact IC card 14 and the reader/writer 11 may be performed by directly putting the noncontact IC card 14 over the reader/writer 11 without the user's (human body 15) using the communication terminal apparatus 13. In that case, the noncontact IC card 14 and the reader/writer 11 directly perform noncontact IC card communication so as to transmit/receive data.

Figure 2:
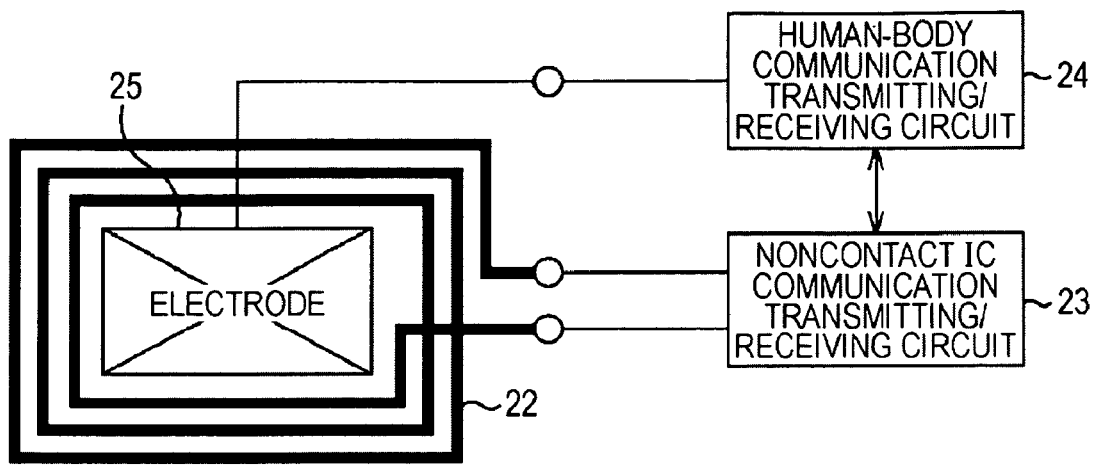
FIG. 2 is a diagram illustrating an example of a configuration of a loop antenna and a communication electrode.

In the communication terminal apparatus 12, the loop antenna 22 and the communication electrode 25 are close to each other, as illustrated in FIG. 2, for example. In FIG. 2, parts corresponding to those in FIG. 1 are denoted by the same reference numerals, and the corresponding description is appropriately omitted.

Referring to FIG. 2, the loop antenna 22 connected to the noncontact IC communication transmitting/receiving circuit 23 is coil-shaped, and the communication electrode 25 is placed in the opening portion thereof. In other words, the communication electrode 25 is placed in a position surrounded by the loop antenna 22.

According to a related art, a communication electrode for human-body communication includes a copper plate. Thus, when the communication electrode is placed near a loop antenna, an eddy current occurs in the communication electrode, and an effect of a magnetic field generated due to the eddy current causes degradation of a communication characteristic of noncontact IC card communication.

On the other hand, the communication electrode 25 of the communication terminal apparatus 12 includes a transparent conductive film that has higher electrical resistance than that of metal such as copper and that transmits a magnetic field. Thus, even if the communication electrode 25 receives a magnetic field generated from the loop antenna 22, an eddy current is less likely to occur in the communication electrode 25.

Figure 3:
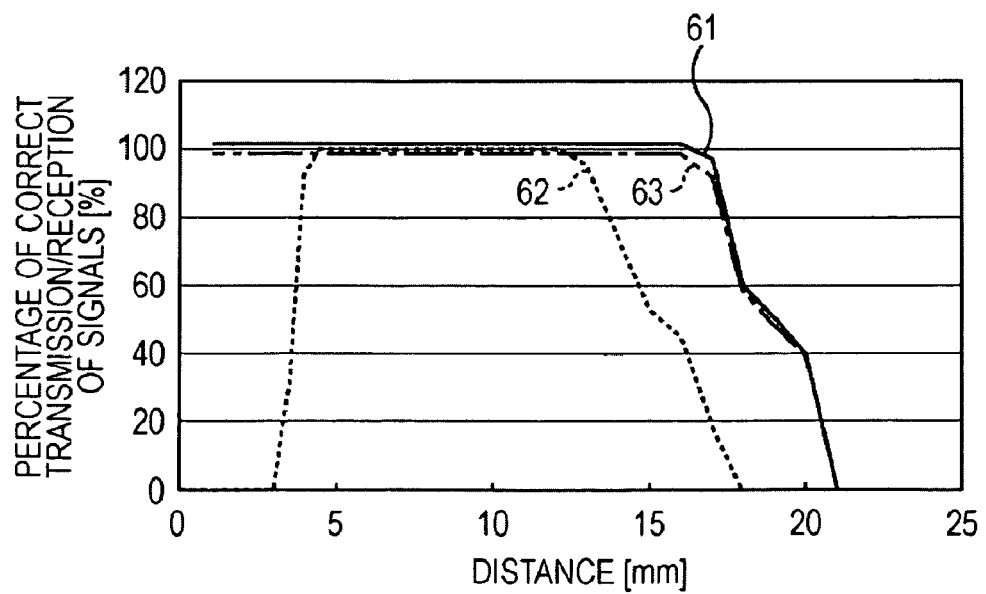
FIG. 3 is a graph illustrating characteristics of noncontact IC card communication of respective communication electrodes.

Thus, even if the communication electrode 25 and the loop antenna 22 for noncontact IC card communication are placed on the same plane in the communication terminal apparatus 12, the communication electrode 25 does not affect the characteristic of noncontact IC card communication of the communication terminal apparatus 12, as illustrated in FIG. 3, for example. Referring to FIG. 3, the vertical axis indicates the percentage of signals correctly received in noncontact IC card communication, that is, how reliably signals have been transmitted/received. The horizontal axis indicates the distance between the loop antennas 22 and 21.

In FIG. 3, respective curves 61 to 63 indicate the characteristic of noncontact IC card communication of the communication terminal apparatus 12 in the case where the communication electrode 25 is not provided in the opening portion of the loop antenna 22, in the case where the communication electrode 25 includes a copper plate, and in the case where the communication electrode 25 includes ITO, respectively.

In the case where the communication electrode 25 is not provided in the communication terminal apparatus 12, when the distance between the communication terminal apparatus 12 and the reader/writer 11, that is, the distance between the loop antennas 22 and 21, is about 0 to 17 mm, the percentage of correct transmission/reception of signals is 100% as indicated by the curve 61, so that the communication terminal apparatus 12 and the reader/writer 11 can reliably transmit/receive a signal. Also, it can be understood that the percentage of correct transmission/reception of signals gradually decreases as the distance between the communication terminal apparatus 12 and the reader/writer 11 is longer than 17 mm and that it becomes difficult for the communication terminal apparatus 12 and the reader/writer 11 to transmit/receive a signal to/from each other when the distance therebetween is 21 mm or more.

In the case where the communication electrode including a copper plate is placed in the opening portion of the loop antenna 22, as indicated by the curve 62, it can be understood that the communication characteristic is degraded compared to the case of the curve 61 when the distance between the communication terminal apparatus 12 and the reader/writer 11 is about 0 to 4 mm and is 12 mm or more.

Specifically, in the case where the communication electrode includes a copper plate, the percentage of correct transmission/reception of signals is 0% when the distance between the communication terminal apparatus 12 and the reader/writer 11 is about 0 to 4 mm, and thus it is difficult for the communication terminal apparatus 12 to communicate with the reader/writer 11. On the other hand, when the distance between the communication terminal apparatus 12 and the reader/writer 11 is about 4 to 13 mm, the percentage of correct transmission/reception of signals is 100%. The percentage gradually decreases as the distance becomes longer than 13 mm, and it is difficult for the communication terminal apparatus 12 and the reader/writer 11 to transmit/receive a signal to/from each other when the distance therebetween is 18 mm or more.

On the other hand, in the case where the communication electrode 25 including ITO is placed in the opening portion of the loop antenna 22, as indicated by the curve 63, it can be understood that the communication characteristic hardly degrades compared to the case where the communication electrode is not provided. That is, the values of percentage indicted by the curve 63 are almost the same as those indicated by the curve 61 in the respective distances.

As described above, in the case where the communication electrode 25 includes a transparent conductive film having higher electrical resistance than that of metal, the communication electrode 25 can be placed near the loop antenna 22 without causing degradation of the characteristic of noncontact IC card communication.

By placing the communication electrode 25 in the opening portion of the loop antenna 22, the necessity for newly providing an area for placing the communication electrode 25 for human-body communication in the communication terminal apparatus 12 can be eliminated. That is, the communication electrode for human-body communication can be mounted on the existing communication terminal apparatus without newly providing an area for placing the communication electrode. Accordingly, the communication terminal apparatus 12 can be miniaturized.

Figure 4:
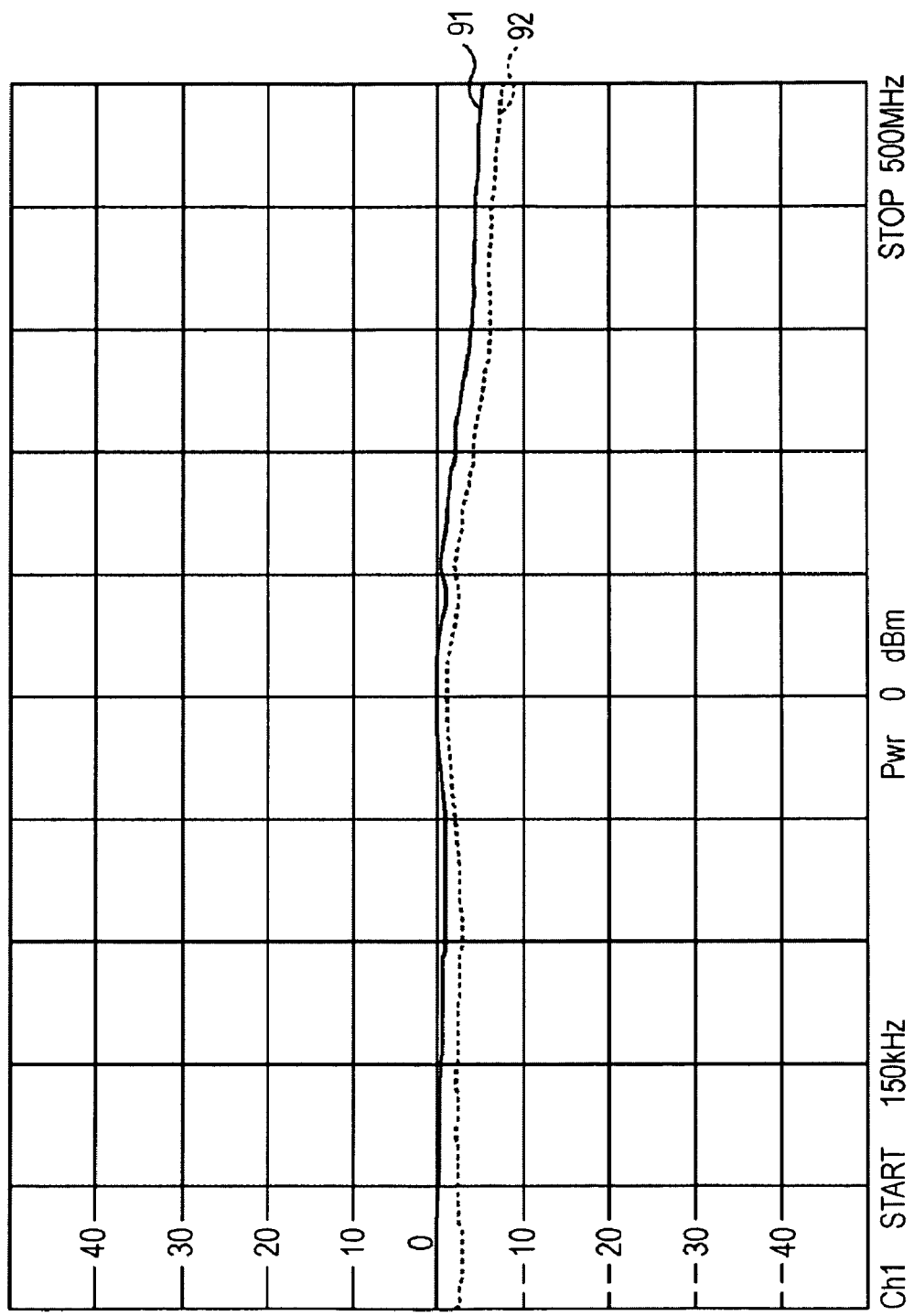
FIG. 4 is a graph illustrating frequency characteristics of the respective communication electrodes.

Furthermore, in the case where the communication electrode 25 for transmitting/receiving signals for human-body communication includes a transparent conductive film, not a copper plate used in a related art, the communication characteristic of human-body communication does not degrade, as illustrated in FIG. 4, for example. FIG. 4 illustrates a frequency characteristic of the communication electrode for human-body communication. In FIG. 4, the vertical axis indicates the gain of a signal, that is, the degree of degradation on a receiver side of a transmitted signal, whereas the horizontal axis indicates the frequency of the signal.

A curve 91 indicates the frequency characteristic in the case where the communication electrode 25 includes a copper plate having a size of 32 mm×42 mm. A curve 92 indicates the frequency characteristic in the case where the communication electrode 25 includes ITO and the size thereof is 32 mm×42 mm.

In the curves 91 and 92, the gains of signals in respective frequencies are almost the same, and it can be understood that the communication characteristic of human-body communication hardly degrades in the case where the communication electrode 25 includes ITO, compared to the case where the communication electrode includes a copper plate. That is, an adequate communication characteristic can be obtained in the case where the communication electrode 25 includes a transparent conductive film of ITO or the like.

In this way, by using a transparent conductive film for the communication electrode 25 and placing the communication electrode 25 in the opening portion of the loop antenna 22, the communication terminal apparatus 12 can be miniaturized and can communicate with the reader/writer 11 and the communication terminal apparatus 13 more reliably.

In the above description, the communication electrode 25 is provided in the opening portion of the loop antenna 22. More specifically, as illustrated in FIG. 5, for example, the communication electrode 25 including a transparent conductive film is rectangular-parallelepiped-shaped and a copper wire serving as the loop antenna 22 is coiled on the side surface of the communication electrode 25. The coiled copper wire serves as the loop antenna 22.

In this way, in FIG. 5, the loop antenna 22 is coiled on the side surface of the communication electrode 25 so that the loop antenna 22 and the communication electrode 25 are integrated with each other, and the communication electrode 25 is provided in the opening portion of the loop antenna 22.

Alternatively, in the case where the loop antenna 22 and the communication electrode 25 are integrated with each other, a copper material serving as the loop antenna 22 may be directly applied on a surface of the rectangular-parallelepiped-shaped communication electrode 25, and the copper material may serve as the loop antenna 22, as illustrated in FIG. 6.

Referring to FIG. 6, the copper material is directly applied on the upper surface of the communication electrode 25, so that a coil pattern (the loop antenna 22) is formed on the surface of the communication electrode 25. That is, the pattern of the copper material applied on the surface of the communication electrode 25 servers as the loop antenna 22.

Furthermore, as illustrated in FIG. 7, a rectangular-parallelepiped-shaped flexible substrate 121 of which surface is provided with the loop antenna 22 may be laminated on the rectangular-parallelepiped-shaped communication electrode 25. In FIG. 7, the coiled loop antenna 22 is provided on the upper surface of the flexible substrate 121, and the flexible substrate 121 is laminated on the communication electrode 25, so that the loop antenna 22 and the communication electrode 25 are integrated with each other. That is, the lower surface of the flexible substrate 121 is laminated on the upper surface of the communication electrode 25.

As described above, the communication terminal apparatus 12 can be miniaturized by integrating the loop antenna 22 and the communication electrode 25 with each other. In the above description, the communication electrode 25 and the loop antenna 22 are integrated with each other. Also, in the communication terminal apparatus 13, the communication electrode 26 and the loop antenna 29 may be integrated with each other. In that case, as in the cases illustrated in FIGS. 5 to 7, a copper wire is coiled on the rectangular-parallelepiped-shaped communication electrode 26 including a transparent conductive film so that the copper wire serves as the loop antenna 29, a copper material is applied on the surface of the communication electrode 26 so that the copper material serves as the loop antenna 29, or a flexible substrate of which surface is provided with the loop antenna 29 is laminated on the communication electrode 26 so that the loop antenna 29 and the communication electrode 26 are integrated with each other.

Figure 8:
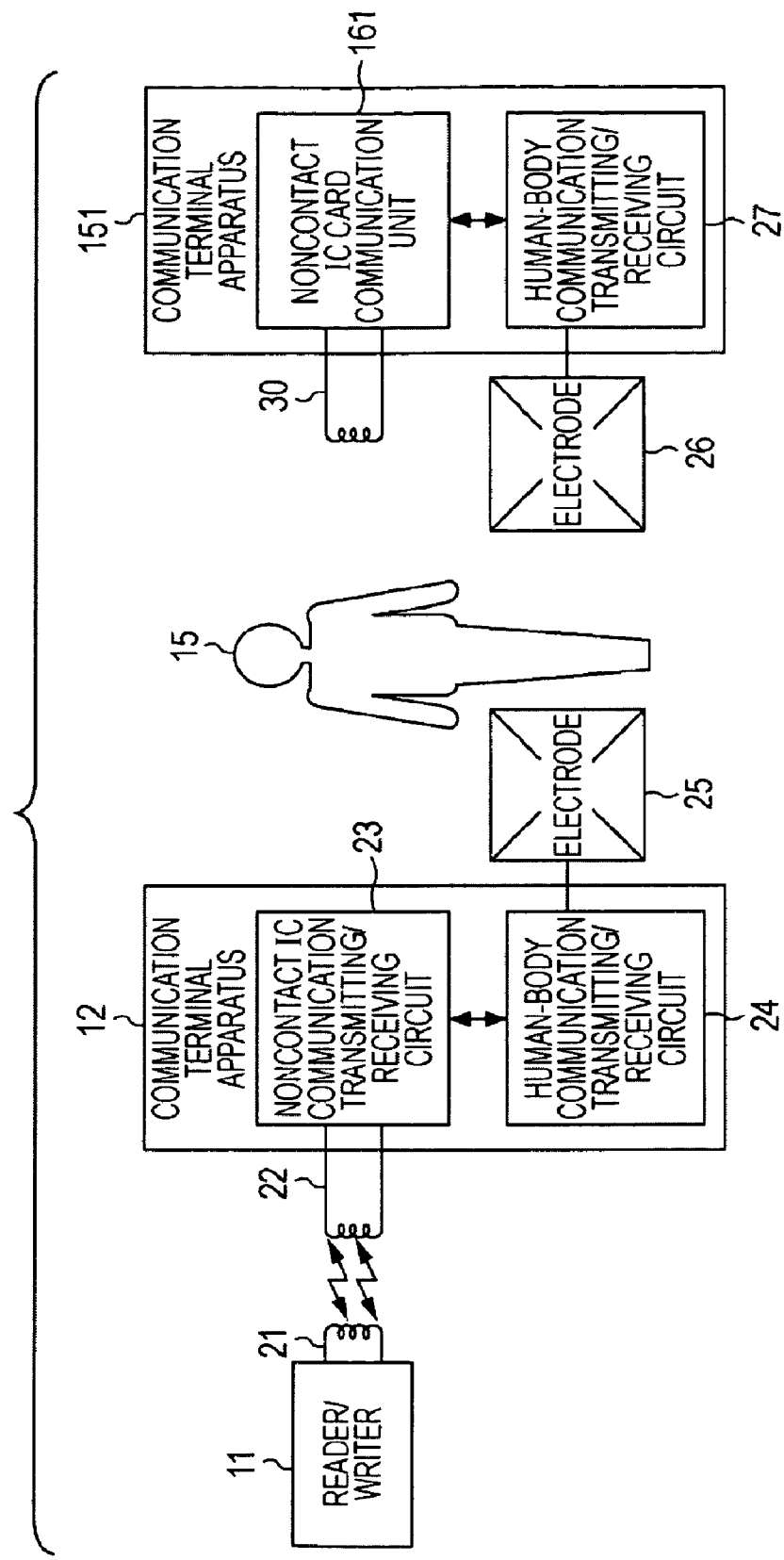
FIG. 8 is a diagram illustrating another example of the configuration of the communication system.

Furthermore, in the communication system illustrated in FIG. 1, the communication terminal apparatus 13 and the noncontact IC card 14 carried by the user (human body 15) may be integrated with each other. In that case, as illustrated in FIG. 8, for example, a communication terminal apparatus 151 carried by the user is provided with the communication electrode 26 for human-body communication and the loop antenna 30 for noncontact IC card communication. In FIG. 8, parts corresponding to those in FIG. 1 are denoted by the same reference numerals and the corresponding description is appropriately omitted.

Referring to FIG. 8, the communication terminal apparatus 151 is provided with the communication electrode 26, the human-body communication transmitting/receiving circuit 27, the loop antenna 30, and a noncontact IC card communication unit 161. The human-body communication transmitting/receiving circuit 27 converts a signal for human-body communication received by the communication electrode 26 to a signal for noncontact IC card communication and supplies the signal to the noncontact IC card communication unit 161.

The noncontact IC card communication unit 161 performs a process in response to a signal supplied from the human-body communication transmitting/receiving circuit 27. For example, when being supplied with a signal from the human-body communication transmitting/receiving circuit 27, the noncontact IC card communication unit 161 supplies a signal for noncontact IC card communication to transmit data corresponding to the supplied signal, e.g., data requested to be transmitted, to the human-body communication transmitting/receiving circuit 27. Then, the human-body communication transmitting/receiving circuit 27 converts the signal supplied from the noncontact IC card communication unit 161 to a signal for human-body communication and transmits the signal obtained through the conversion via the communication electrode 26.

The loop antenna 30 connects to the noncontact IC card communication unit 161. When the communication terminal apparatus 151 is put over the reader/writer 11 by the user and when the loop antenna 30 receives a signal transmitted from the reader/writer 11, the noncontact IC card communication unit 161 obtains power to be driven and performs a process in response to the signal received by the loop antenna 30.

For example, the noncontact IC card communication unit 161 changes a load on the loop antenna 30 in accordance with the data requested to be transmitted and allows the loop antenna 30 to generate a magnetic field corresponding to the data, thereby allowing the loop antenna 30 to transmit a signal for noncontact IC card communication. Then, the reader/writer 11 receives the signal transmitted from the loop antenna 30 and performs a process in response to the received signal.

In this way, in the communication system illustrated in FIG. 8, the user (human body 15) may allow the reader/writer 11 and the noncontact IC card communication unit 161 to transmit/receive data to/from each other via the communication terminal apparatus 12 through human-body communication by using the communication electrode 26, or may allow the reader/writer 11 and the communication terminal apparatus 151 to perform direct noncontact IC card communication.

In the communication terminal apparatus 151, too, as in the cases illustrated in FIGS. 5 to 7, the communication electrode 26 and the loop antenna 30 may be integrated with each other.

Alternatively, as illustrated in FIG. 9, for example, the loop antenna 22 used in noncontact IC card communication may also be used as a communication electrode for human-body communication in the communication terminal apparatus 12. In FIG. 9, parts corresponding to those in FIG. 1 are denoted by the same reference numerals, and the corresponding description is appropriately omitted.

In FIG. 9, the noncontact IC communication transmitting/receiving circuit 23 connects to the loop antenna 22 for noncontact IC card communication. Furthermore, the human-body communication transmitting/receiving circuit 24 connects to the loop antenna 22.

The human-body communication transmitting/receiving circuit 24 transmits/receives a signal to/from the communication terminal apparatus 13 via the human body 15 by using the loop antenna 22 as a communication electrode for human-body communication. Specifically, the human-body communication transmitting/receiving circuit 24 causes a potential difference between the ground (not illustrated) provided in the human-body communication transmitting/receiving circuit 24 and the loop antenna 22, thereby transmitting a signal to the communication terminal apparatus 13, and detects a potential difference between the ground and the loop antenna 22, thereby receiving a signal transmitted from the communication terminal apparatus 13.

When a signal for human-body communication is transmitted/received by the loop antenna 22 in the communication terminal apparatus 12, the signal is transmitted/received by using the potential difference between the loop antenna 22 and the ground, and thus it is unnecessary to supply a current to the loop antenna 22.

At reception of a signal, a weak signal from the loop antenna 22 as a communication electrode is received, and thus it is desirable that the impedance of the human-body communication transmitting/receiving circuit 24 is high. Accordingly, the impedance of the human-body communication transmitting/receiving circuit 24 viewed from the loop antenna 22 can be high with respect to the carrier frequency of the signal for noncontact IC card communication, and thus a current flowing in the loop antenna 22 can be prevented from flowing into the human-body communication transmitting/receiving circuit 24.

As described above, even if the loop antenna 22 is used as a communication electrode with the human-body communication transmitting/receiving circuit 24 being connected to the loop antenna 22, the characteristic of noncontact IC card communication in the communication terminal apparatus 12 does not degrade. Furthermore, since the loop antenna 22 for noncontact IC card communication is used as a communication electrode, an eddy current due to an effect of a magnetic field from the loop antenna does not occur. Accordingly, communication with the reader/writer 11 and the communication terminal apparatus 13 can be performed more reliably.

Also, since the loop antenna 22 is shared by the human-body communication transmitting/receiving circuit 24 and the noncontact IC communication transmitting/receiving circuit 23, the necessity to newly provide an area for mounting the communication electrode can be eliminated and the communication terminal apparatus 12 can be miniaturized.

As in the case illustrated in FIG. 9, the human-body communication transmitting/receiving circuit 27 may be connected to the loop antenna 29 illustrated in FIG. 1 and the loop antenna 29 may be used as a communication electrode for human-body communication. Also, the human-body communication transmitting/receiving circuit 27 may be connected to the loop antenna 30 illustrate in FIG. 8 and the loop antenna 30 may be used as a communication electrode for human-body communication.

Figure 10:
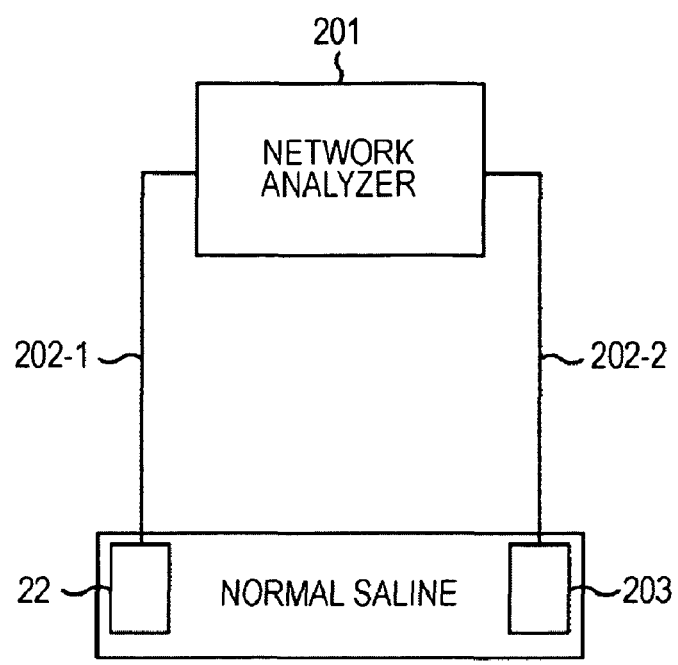
FIG. 10 is a diagram illustrating a system for measuring a frequency characteristic.

When the frequency characteristic in the case where the loop antenna 22 is used as a communication electrode for human-body communication as illustrated in FIG. 9 is measured by the measurement system illustrated in FIG. 10, for example, it can be found that the frequency characteristic does not degrade compared to the case where a copper plate is used as a communication electrode.

In the measurement system illustrated in FIG. 10, coaxial cables 202-1 and 202-2 connect to a network analyzer 201. The ends of the coaxial cables 202-1 and 202-2 connect to the loop antenna 22 as a communication electrode and a loop antenna 203 that is the same as the loop antenna 22, respectively. The loop antennas 22 and 203 are placed in a container filled with normal saline as a communication medium for human-body communication.

For example, the network analyzer 201 allows the loop antenna 22 to transmit a signal for human-body communication and allows the loop antenna 203 to receive the signal. Also, the network analyzer 201 measures the frequency characteristic of the signal received by the loop antenna 203, that is, the degree of degradation of the signal on the receiver side.

Hereinafter, each of the coaxial cables 202-1 and 202-2 is simply called as a coaxial cable 202 when it is unnecessary to distinguish the coaxial cables from each other.

When the frequency characteristic of a communication electrode that is a copper-plate electrode including a copper plate according to a related art is measured in the measurement system illustrated in FIG. 10, the measurement is performed while the copper-plate electrode as a communication electrode is connected to the end of the coaxial cable 202.

Figure 11:
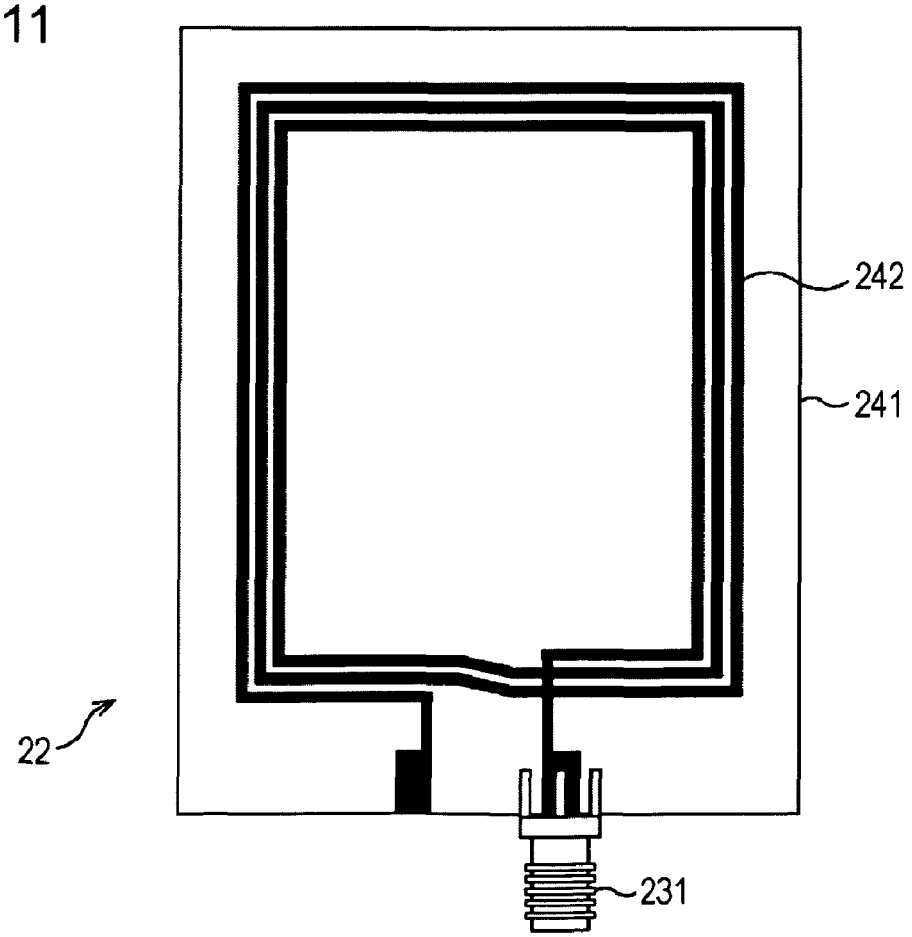
FIG. 11 is a diagram illustrating a connection example of the loop antenna to a coaxial cable.

More specifically, when the loop antenna 22 is connected to the end of the coaxial cable 202, the loop antenna 22 is connected to a connector 231 provided at the end of the coaxial cable 202, as illustrated in FIG. 11, for example. In FIG. 11, the loop antenna 22 includes a flexible substrate 241 and a pattern 242, which is formed by applying a loop antenna material such as copper on the flexible substrate 241.

For example, the width of the pattern 242 (pattern width) is 1 mm. The pattern 242 is coiled in a rectangular shape: 40 mm in the horizontal direction and 50 mm in the vertical direction in the figure, and the number of turns is 3. The flexible substrate 241 is fixed to the connector 231 such that the terminal of the connector 231 connects to one end of the pattern 242.

Figure 12:
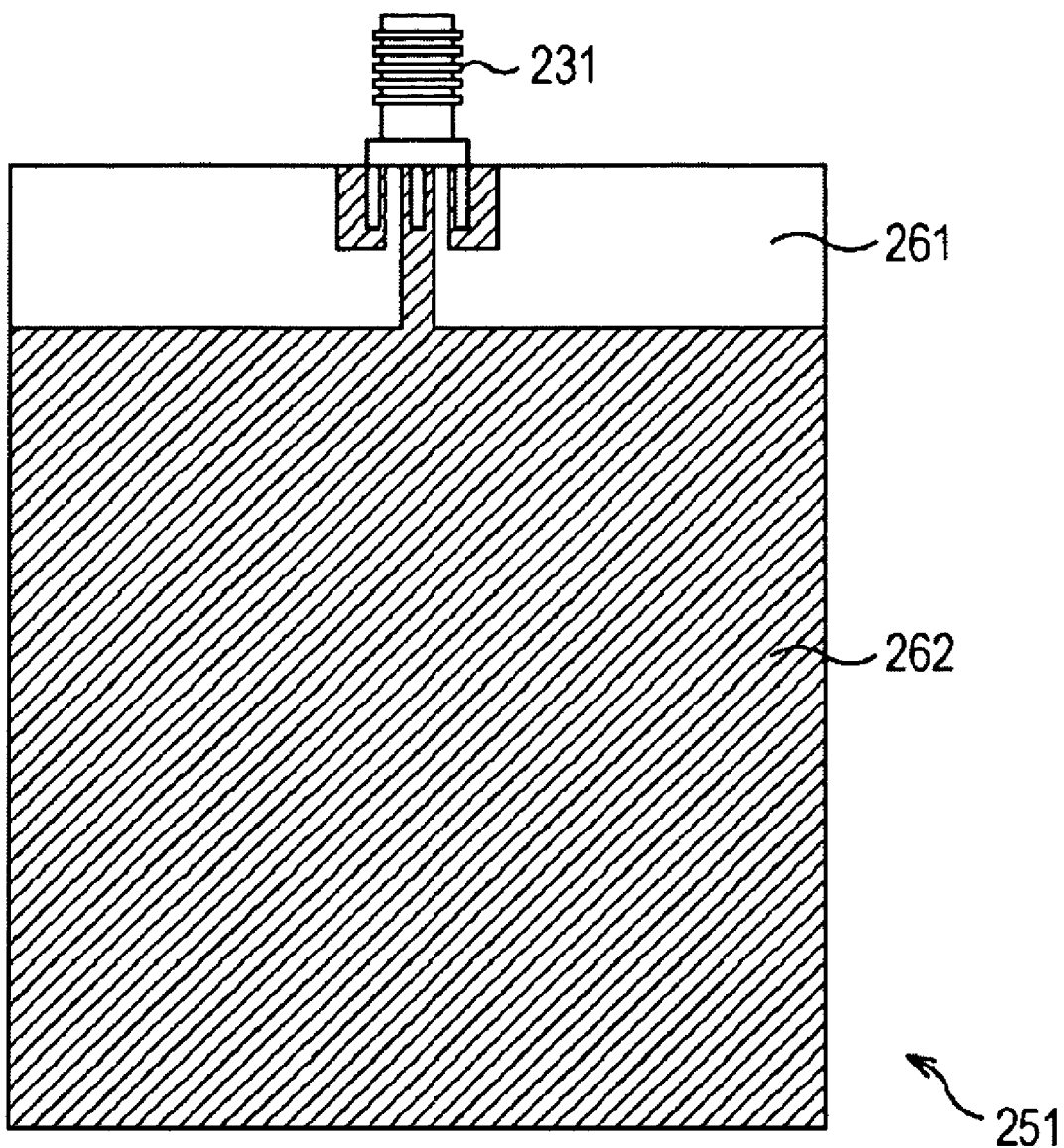
FIG. 12 is a diagram illustrating a connection example of a copper-plate electrode to the coaxial cable.

Furthermore, in the case where a copper-plate electrode is connected to the end of the coaxial cable 202, the copper-plate electrode 251 is connected to the connector 231 provided at the end of the coaxial cable 202, as illustrated in FIG. 12, for example. In FIG. 12, the copper-plate electrode 251 includes a substrate 261 and a pattern 262, which is formed by applying copper on the substrate 261.

For example, the pattern 262 has a substantially square shape: 50 mm in the horizontal direction and 50 mm in the vertical direction in the figure. At the upper side of the pattern 262, a portion protruded upward from the square portion is provided. The substrate 261 is fixed to the connector 231 such that the terminal provided at the center of the connector 231 connects to the protruded portion. The terminals on both sides of the center terminal of the connector 231 are connected to the ground of the network analyzer 201. Those terminals are provided on the substrate 261 and connect to rectangular patterns that do not electrically connect to the pattern 262.

Figure 13:
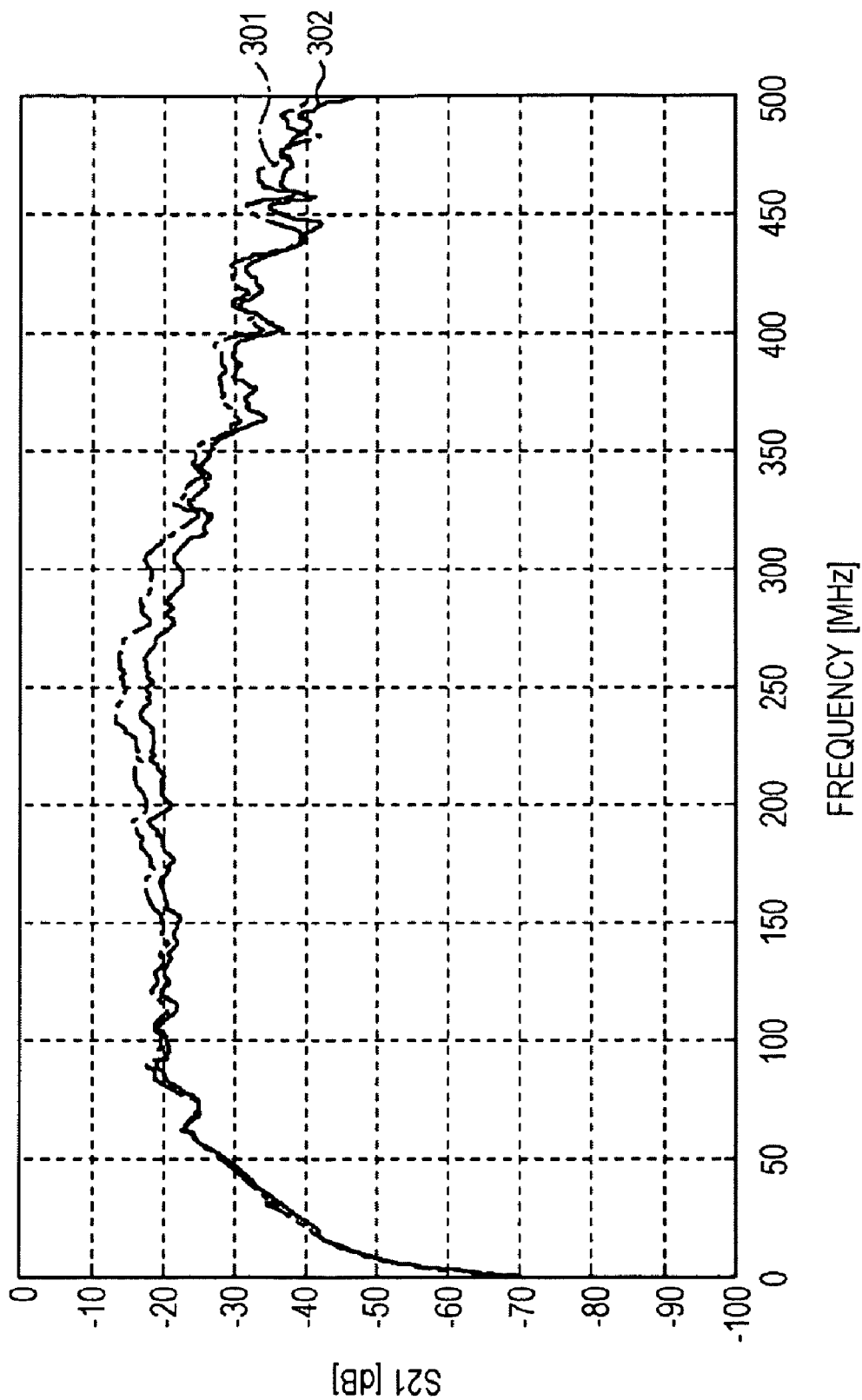
FIG. 13 is a graph illustrating frequency characteristics of respective communication electrodes.

In the measurement system illustrated in FIG. 10 described above, if the loop antenna 22 or the copper-plate electrode 251 is connected to the coaxial cable 202 and the frequency characteristic thereof is measured, the measurement result shown in FIG. 13 is obtained, for example. In FIG. 13, the vertical axis indicates the gain of a signal, that is, the degree of degradation on the receiver side of a transmitted signal, whereas the horizontal axis indicates the frequency of the signal.

A curve 301 indicates the frequency characteristic in the case where the copper-plate electrode 251 as a communication electrode illustrated in FIG. 12 is connected to the coaxial cable 202, whereas a curve 302 indicates the frequency characteristic in the case where the loop antennas 22 and 203 are connected to the coaxial cables 202.

In the curves 301 and 302, the gains of the signal in respective frequencies are almost the same. That is, even if the loop antenna 22 for noncontact IC card communication is used as a communication electrode for human-body communication, the communication characteristic of human-body communication hardly degrades compared to the case of using the copper-plate electrode 251 according to the related art. In other words, even if the loop antenna 22 for noncontact IC card communication is used as a communication electrode for human-body communication, an adequate communication characteristic can be obtained and communication can be reliably performed.

In the above description, a signal is transmitted/received by using a potential difference between the communication electrode 25 or the loop antenna 22 as a communication electrode and the ground. That is, a signal received by the communication electrode 25 or the loop antenna 22 is amplified with the ground being a reference. In this case, the potential difference between the ground and the communication electrode (difference in signal level) varies due to an effect of the area or mounting position of the ground. Thus, the effect of the area or mounting position of the ground plane (ground) of the human-body communication transmitting/receiving circuit 24 on the communication characteristic of human-body communication is significant, and thus the communication characteristic may degrade.

The effect of the area or mounting position of the ground plane of the human-body communication transmitting/receiving circuit 24 on the communication characteristic of human-body communication can be circumvented by providing two communication electrodes and amplifying a difference in level of signals received by the respective communication electrodes.

In such a case, as illustrated in FIG. 14, for example, the communication electrode 25 and the loop antenna 22 are connected to the human-body communication transmitting/receiving circuit 24, and a signal for human-body communication is transmitted/received by using the communication electrode 25 and the loop antenna 22. In FIG. 14, parts corresponding to those in FIG. 1 are denoted by the same reference numerals, the corresponding description is appropriately omitted.

In FIG. 14, the loop antenna 22 connects to the noncontact IC communication transmitting/receiving circuit 23. The noncontact IC communication transmitting/receiving circuit 23 uses the loop antenna 22 as an antenna for noncontact IC card communication. The communication electrode 25 and the loop antenna 22 connect to the human-body communication transmitting/receiving circuit 24. The communication electrode 25 is placed in the opening portion of the loop antenna 22. In human-body communication, the communication electrode 25 and the loop antenna 22 function as a communication electrode for human body-communication.

The human-body communication transmitting/receiving circuit 24 causes a potential difference between the communication electrode 25 and the loop antenna 22, thereby transmitting a signal for human-body communication via the communication electrode 25. Also, the human-body communication transmitting/receiving circuit 24 detects a potential difference between the communication electrode 25 and the loop antenna 22, thereby receiving a signal for human-body communication transmitted via the human body 15. That is, each of the communication electrode 25 and the loop antenna 22 receives a signal for human-body communication transmitted via the human body 15 and supplies the signal to the human-body communication transmitting/receiving circuit 24. Then, the human-body communication transmitting/receiving circuit 24 amplifies a difference in level (potential) of signals received in the communication electrode 25 and the loop antenna 22 so as to obtain a signal for human-body communication.

Here, the difference in level of signals received in the communication electrode 25 and the loop antenna 22 can be increased by adjusting the size of the communication electrode 25 mounted in the opening portion of the loop antenna 22. Also, by inverting the phase of a signal received by any of the communication electrode 25 and the loop antenna 22 in the human-body communication transmitting/receiving circuit 24, the difference in level of received signals can be doubled.

As described above, by placing the communication electrode 25 in the opening portion of the loop antenna 22 and by using the loop antenna 22 as a reference point used to transmit/receive a signal for human-body communication, the communication terminal apparatus 12 can be miniaturized. Furthermore, since human-body communication is performed by using a potential difference between the loop antenna 22 and the communication electrode 25, the effect of the area or mounting position of the ground plane of the human-body communication transmitting/receiving circuit 24 can be circumvented and the communication characteristic of human-body communication can be further enhanced. Therefore, communication can be performed more reliably.

In the example illustrated in FIG. 14, the communication electrode 25 is placed in the opening portion of the loop antenna 22. Alternatively, the communication electrode 25 and the loop antenna 22 may be integrated with each other as illustrated in FIGS. 5 to 7. Alternatively, the communication electrode 25 and the loop antenna 22 may be mounted on front and rear surface of a case of the communication terminal apparatus 12, that is, at positions facing each other in the case. If there is no area limitation for placement in the case, the communication electrode 25 and the loop antenna 22 may be mounted on the same plane such that they are adjacent with each other. In such a case, too, a signal for human-body communication can be transmitted/received while maintaining an adequate communication characteristic of noncontact IC card communication.

Furthermore, in the communication terminal apparatus 13 illustrated in FIG. 1, the communication electrode 26 and the loop antenna 29 may be connected to the human-body communication transmitting/receiving circuit 27, and a signal for human-body communication may be transmitted/received by using the communication electrode 26 and the loop antenna 29. Likewise, in the communication terminal apparatus 151 illustrated in FIG. 8, the communication electrode 26 and the loop antenna 30 may be connected to the human-body communication transmitting/receiving circuit 27, and a signal for human-body communication may be transmitted/received by using the communication electrode 26 and the loop antenna 30.

In the above description, the communication terminal apparatuses 12 and 13 or the communication terminal apparatuses 12 and 151 communicate with each other by using the human body 15 as a communication medium. However, the communication medium is not limited to the human body 15, but any material having a physical characteristic capable of transmitting electric signals, such as a conductive or dielectric material, may be used.

The embodiments of the present invention are not limited to those described above, and various modifications can be applied without deviating from the scope of the present invention.

What is claimed is:

1. A communication apparatus comprising:
an antenna configured to generate a magnetic field corresponding to a signal of a first communication method; and
a communication unit configured to perform communication via a communication medium by transmitting/receiving a signal of a second communication method by using a potential difference between the communication unit and a predetermined reference point, the communication unit including a transparent conductive film,
wherein the antenna and the communication unit are integrated with each other.

2. The communication apparatus according to claim 1, wherein the antenna is wound on a side surface of the communication unit, whereby the antenna is integrated with the communication unit.

3. The communication apparatus according to claim 1, wherein a material of the antenna is applied on a surface of the communication unit, whereby the antenna is provided on the surface of the communication unit.

4. The communication apparatus according to claim 1, wherein a substrate provided with the antenna is laminated on the communication unit, whereby the antenna and the communication unit are integrated with each other.

5. A communication apparatus comprising:
an antenna configured to generate a magnetic field corresponding to a first signal of a first communication method;
first communication control means for obtaining the first signal received by the antenna or allowing the antenna to generate a magnetic field and to transmit the first signal; and
second communication control means for transmitting a second signal of a second communication method by causing a potential difference between a predetermined reference point and the antenna or receiving the second signal by detecting a potential difference occurred between the reference point and the antenna, wherein the second communication control means connects to the antenna.

6. The communication apparatus according to claim 5, wherein the second communication control means converts the first signal obtained by the first communication control means to the second signal and transmits the second signal, or converts the received second signal to the first signal and supplies the first signal to the first communication control means.

7. A communication apparatus comprising:
an antenna configured to generate a magnetic field corresponding to a first signal of a first communication method;
first communication control means for obtaining the first signal received by the antenna or allowing the antenna to generate a magnetic field and to transmit the first signal;
a communication unit configured to transmit or receive a second signal of a second communication method via a communication medium; and
second communication control means for transmitting the second signal by causing a potential difference between the antenna and the communication unit or receiving the second signal by detecting a potential difference occurred between the antenna and the communication unit, wherein the second communication control means connects to the antenna and the communication unit.

8. The communication apparatus according to claim 7, wherein the second communication control means converts the first signal obtained by the first communication control means to the second signal and transmits the second signal, or converts the received second signal to the first signal and supplies the first signal to the first communication control means.

9. The communication apparatus according to claim 7, wherein the communication unit includes a transparent conductive film and is provided in an opening portion of the antenna.

10. A communication apparatus comprising:
an antenna configured to generate a magnetic field corresponding to a first signal of a first communication method;
a first communication control unit configured to obtain the first signal received by the antenna or allow the antenna to generate a magnetic field and to transmit the first signal; and
a second communication control unit configured to transmit a second signal of a second communication method by causing a potential difference between a predetermined reference point and the antenna or receive the second signal by detecting a potential difference occurred between the reference point and the antenna, wherein the second communication control unit connects to the antenna.

11. The communication apparatus of any one of claims 1, 5, and 10, wherein the reference point is selected from the antenna and a ground.

12. A communication apparatus comprising:
an antenna configured to generate a magnetic field corresponding to a first signal of a first communication method;
a first communication control unit configured to obtain the first signal received by the antenna or allow the antenna to generate a magnetic field and to transmit the first signal;
a communication unit configured to transmit or receive a second signal of a second communication method via a communication medium; and
a second communication control unit configured to transmit the second signal by causing a potential difference between the antenna and the communication unit or receive the second signal by detecting a potential difference occurred between the antenna and the communication unit, wherein the second communication control unit connects to the antenna and the communication unit.

13. The communication apparatus of any one of claims 1, 7, and 12, wherein the communication medium is selected from a conducting material and a dielectric material.

14. The communication apparatus of any one of claims 1, 7, and 12, wherein the communication medium comprises a human body.

15. A communication apparatus comprising:
an antenna configured to generate a magnetic field corresponding to a first signal of a first communication method;
first communication control means for obtaining the first signal received by the antenna or allowing the antenna to generate a magnetic field and to transmit the first signal; and
second communication control means for transmitting a second signal of a second communication method by causing a potential difference between a predetermined reference point and the antenna or receiving the second signal by detecting a potential difference occurred between the reference point and the antenna, wherein the second communication control means connects to the antenna;
wherein the second communication control means converts the first signal obtained by the first communication control means to the second signal and transmits the second signal, or converts the received second signal to the first signal and supplies the first signal to the first communication control means.

16. A communication apparatus comprising:
an antenna configured to generate a magnetic field corresponding to a first signal of a first communication method;
first communication control means for obtaining the first signal received by the antenna or allowing the antenna to generate a magnetic field and to transmit the first signal;
a communication unit configured to transmit or receive a second signal of a second communication method via a communication medium; and
second communication control means for transmitting the second signal by causing a potential difference between the antenna and the communication unit or receiving the second signal by detecting a potential difference occurred between the antenna and the communication unit, wherein the second communication control means connects to the antenna and the communication unit;
wherein the second communication control means converts the first signal obtained by the first communication control means to the second signal and transmits the second signal, or converts the received second signal to the first signal and supplies the first signal to the first communication control means.

* * * * *